(12) United States Patent
Satish et al.

(10) Patent No.: US 8,745,742 B1
(45) Date of Patent: Jun. 3, 2014

(54) METHODS AND SYSTEMS FOR PROCESSING WEB CONTENT ENCODED WITH MALICIOUS CODE

(75) Inventors: Sourabh Satish, Fremont, CA (US);
William E. Sobel, Jamul, CA (US);
Bruce McCorkendale, Manhattan Beach, CA (US)

(73) Assignee: Symantec Corporation, Mountain View (CA)

( * ) Notice: Subject to any disclaimer, the term of this patent is extended or adjusted under 35 U.S.C. 154(b) by 1213 days.

(21) Appl. No.: 12/264,101

(22) Filed: Nov. 3, 2008

(51) Int. Cl.
*G06F 12/14* (2006.01)
*G06F 7/00* (2006.01)
*G06F 17/30* (2006.01)

(52) U.S. Cl.
USPC .......... 726/24; 726/23; 726/26; 726/25; 380/202; 380/210; 380/232

(58) Field of Classification Search
USPC .......... 726/23, 24; 713/2, 182, 193; 382/100
See application file for complete search history.

(56) References Cited

U.S. PATENT DOCUMENTS

| | | | | |
|---|---|---|---|---|
| 7,113,615 | B2 * | 9/2006 | Rhoads et al. | 382/100 |
| RE40,919 | E * | 9/2009 | Rhoads | 382/232 |
| 7,827,312 | B2 * | 11/2010 | Ramaswamy et al. | 709/246 |
| 2004/0107416 | A1 | 6/2004 | Buban et al. | |
| 2004/0239681 | A1 * | 12/2004 | Robotham et al. | 345/581 |
| 2006/0005043 | A1 * | 1/2006 | Hsueh | 713/188 |
| 2008/0025559 | A1 * | 1/2008 | Paxson | 382/100 |
| 2008/0085031 | A1 * | 4/2008 | Estevez et al. | 382/100 |
| 2008/0101604 | A1 * | 5/2008 | Kocher et al. | 380/210 |
| 2009/0070873 | A1 * | 3/2009 | McAfee et al. | 726/23 |
| 2009/0077664 | A1 | 3/2009 | Hsu et al. | |
| 2009/0282477 | A1 * | 11/2009 | Chen et al. | 726/22 |

OTHER PUBLICATIONS http://researcher.watson.ibm.com/researcher/files/us-kapil/formalizingIDS-raid07.pdf Understanding Precision in Host Based Intrusion Detection—GA Tech, Sep. 2007.*
http://ce.sharif.edu/courses/89-90/2/ce342-1/resources/root/Critical%20Reading%20Presentations/Steganography,%20Related%20Resources/2-An%20Overview%20of%20Steganography.pdf "An Overview of Steganography" James Madison Univ, Jul. 2007.*
U.S. Appl. No. 12/263,739, filed Nov. 3, 2008, Satish, Sourabh.
Buchanan, Erik; When Good Instructions Go Bad: Generalizing Return-Oriented Programming to RISC; Proceedings of CCS 2008, AMC Press; Oct. 2008; 12 Pages.
Shacham, Hovav; The Geometry of Innocent Flesh on the Bone: Return-into-libc without Function Calls (on the x86); Proceedings of CCS 2007, AMC Press; Oct. 2007; 29 Pages.
Moyer, Shawn; (un) Smashing the Stack Ocerflows, Coutermeasures and the Real World; BlackHat USA 2007;45 Pages.

(Continued)

*Primary Examiner* — Randy Scott
(74) *Attorney, Agent, or Firm* — ALG Intellectual Property, LLC

(57) ABSTRACT

A computer-implemented method for processing web content may comprise receiving web content encoded with malicious steganographic code. Before presenting the web content, the method may comprise modifying the web content to create modified content such that information conveyed by the malicious steganographic code is at least partially corrupted in the modified content. Additionally, a functionality of the modified content may be at least substantially similar to a functionality of the web content following modification of the web content to create the modified content. Various other methods, computer-readable media, and systems are also disclosed.

20 Claims, 8 Drawing Sheets

(56) References Cited

OTHER PUBLICATIONS

Buchanan, Erik et al; Return-Oriented Programming: Exploitation Without Code Injection; University of California, San Diego; 53 Pages.

"Xot 0.5 Beta2"; released Jul. 2001; XenoZ; http://www.megasecurity.org/trojans/x/xot/Xot0.5b2.html.

Non-Final Office Action received in U.S. Appl. No. 12/263,739, dated Jan. 3, 2012.

Monirul Sharif et al., Understanding Precision in Host Based Intrusion, 2007, Formal Analysis and Practical Models, as retrieved on Dec. 14, 2011, http://www.cc.gatech.edu/~giffin/papers/raid07/SSG+07.pdf, pp. 1-21.

\* cited by examiner

METHODS AND SYSTEMS FOR PROCESSING WEB CONTENT ENCODED WITH MALICIOUS CODE

BACKGROUND

Consumers and businesses increasingly use the internet to download web content from a variety of sources. The downloaded web content is often posted by the consumers and businesses on websites, including personal, commercial, academic, or government websites. In efforts to reach and affect large volumes of end users, computer programmers with malicious motivations often covertly embed malicious steganographic code in various forms of web content, such as HyperText Markup Language ("HTML"), JavaScript, and media files, including image files, audio files, video files, and animation files. The malicious code embedded in the web content may contain command and control instructions used to instruct and drive software robots ("bots") operating on the internet. Accordingly, a computer hosting web content containing malicious code may unknowingly become part of a botnet. A computer hosting web content containing malicious code may drive bots in the botnet to perform malicious activities on the internet, such as spamming third parties.

Malicious code may be covertly incorporated into web content in a number of ways. For example, malicious code may be covertly embedded within unused portions of a code document, such as in comments sections or white space portions of an HTML file. Malicious code may also be encoded within software by replacing variables in the software code with characters encoding the malicious code. Malicious code may also be hidden within other types of files, such as media files, by integrating the code into portions of the file itself in such a way that the files appear to be unaffected. Malicious steganographic code may be incorporated into web content in such a manner that it is extremely difficult to detect by security software. However, the malicious code may be readily detected and used by a bot that is programmed to identify the malicious code.

Malicious steganographic code in various types of web content may allow the web content to function normally while enabling the malicious code to be read and used by bots crawling the Internet. Traditional security software may be unable to detect malicious code that is hidden within infected web content. What is needed, therefore, is a way for a user to process web content, particularly web content from untrusted sources, such that any malicious steganographic content embedded within the web content is disabled before the web content is used by an end user.

SUMMARY

Embodiments of the present disclosure process web content received from Internet websites. The web content may include HTML, JavaScript, and various types of media files, including audio files, image files, video files, and animation files. A security module located in a computing device may modify the web content. The security module may be an on-host agent, an in-browser component, or a web proxy component. The security module may process the web content after it is loaded onto a user's computer and before the user opens the content. In some embodiments, the security module may be located on a device other than the end user's computer (e.g., a web proxy) and may process the web content inline before the web content reaches the user's computer. In other embodiments, web content may be received from a user attempting to upload the web content to a web server, and the web server may process the web content.

The security module may process the web content by modifying the web content in such a manner that information conveyed by malicious code covertly encoded in the web content is at least partially corrupted (i.e. rendered partially or completely unusable by a bot). After the web content is modified, the web content may still maintain its functionality even though malicious code stegoed in the web content may be corrupted and rendered useless as a command and control channel for a bot.

In some embodiments, the security module may process all web content received by a computer. In other embodiments, the security module may selectively process web content. For example, the security module may process web content from untrusted sources or web content of a certain file type.

In some embodiments, the security module may identify an unused portion of web content that does not contribute to the functionality of the web content, such as a comments or white space portion (e.g., comments in HTML). The security module may then modify the unused portion of the web content by altering or removing at least part of the unused portion. Additionally, the security module may modify the web content by renaming variables in, or adding characters to, the web content (e.g., variables in JavaScript may be renamed). The security module may also rearrange segments of the web content to modify the web content.

In some embodiments, web content comprising a media file may be transformed by the security module to corrupt malicious code stegoed in the media file. The media file may be an image, audio, video, or animation file (e.g., JPG, MP3, MPEG). Content presented to a user by the media file prior to and following transformation by the security module may be substantially similar from the perspective of the user. In certain embodiments, the security module may transform the media file by applying relatively small changes to a portion of the media file (e.g., changes to hue, brightness, palette, image size). In certain embodiments, the security module may change the format of the media file (e.g., the security module may change the format of the file from JPG to BMP and back to JPG) or may encode or decode the media file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
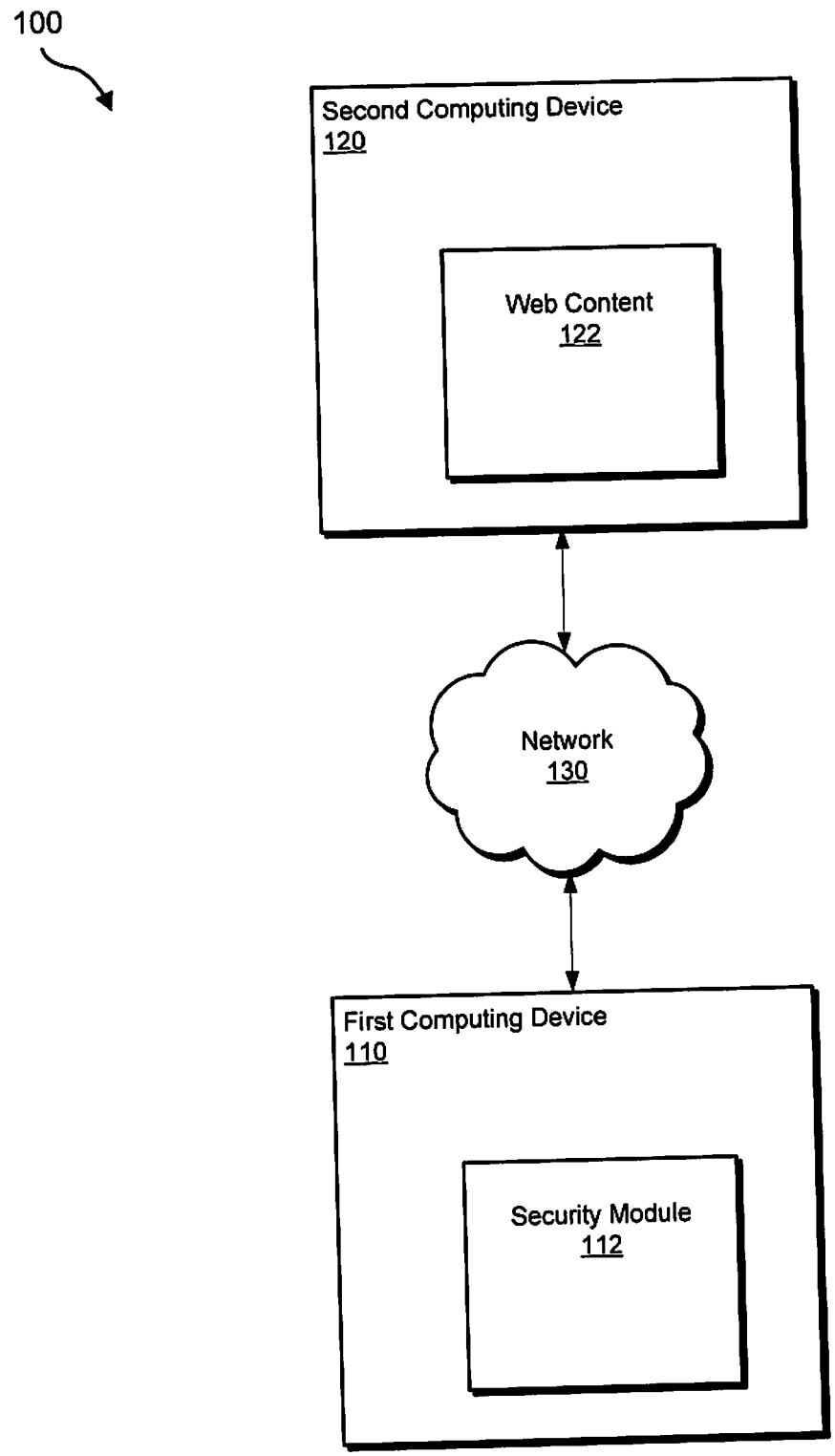
FIG. 1 is a block diagram of an exemplary system for processing web content to corrupt malicious code according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to processing web content encoded with malicious code. In some embodiments, a security module may modify web content encoded with malicious steganographic code in such a manner that information conveyed by the malicious steganographic code is at least partially corrupted while a functionality of the web content is substantially preserved. The methods and systems disclosed herein may provide security software that is capable of disabling malicious steganographic code in web content received from various sources in a variety of forms. As discussed in greater detail below, the methods and systems disclosed herein may provide other features and advantages.

Figure 5:
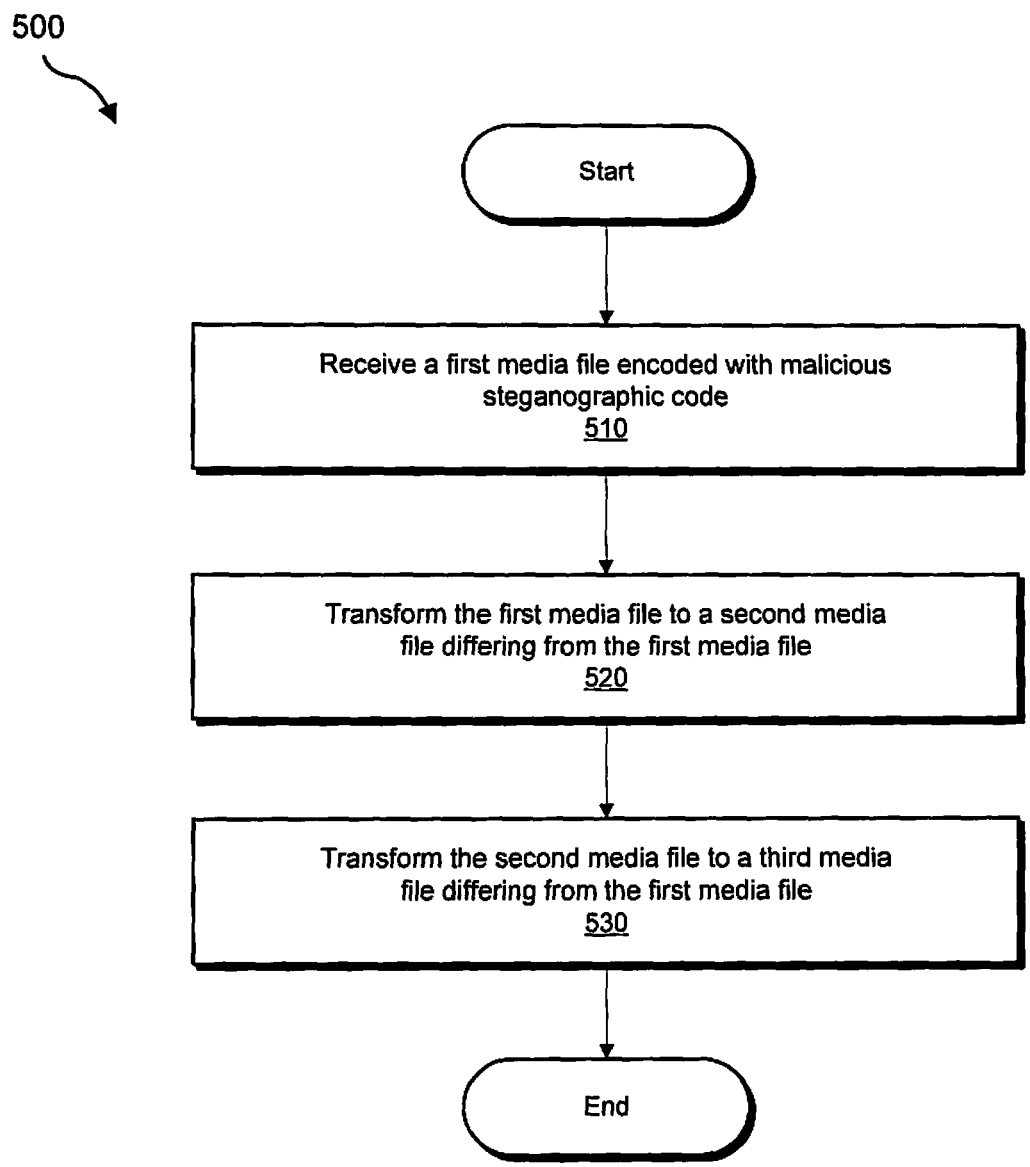
FIG. 5 is a flow diagram of an exemplary method for transforming a first media file to a second media and then to a third media file to corrupt malicious code according to certain embodiments.
Figure 6:
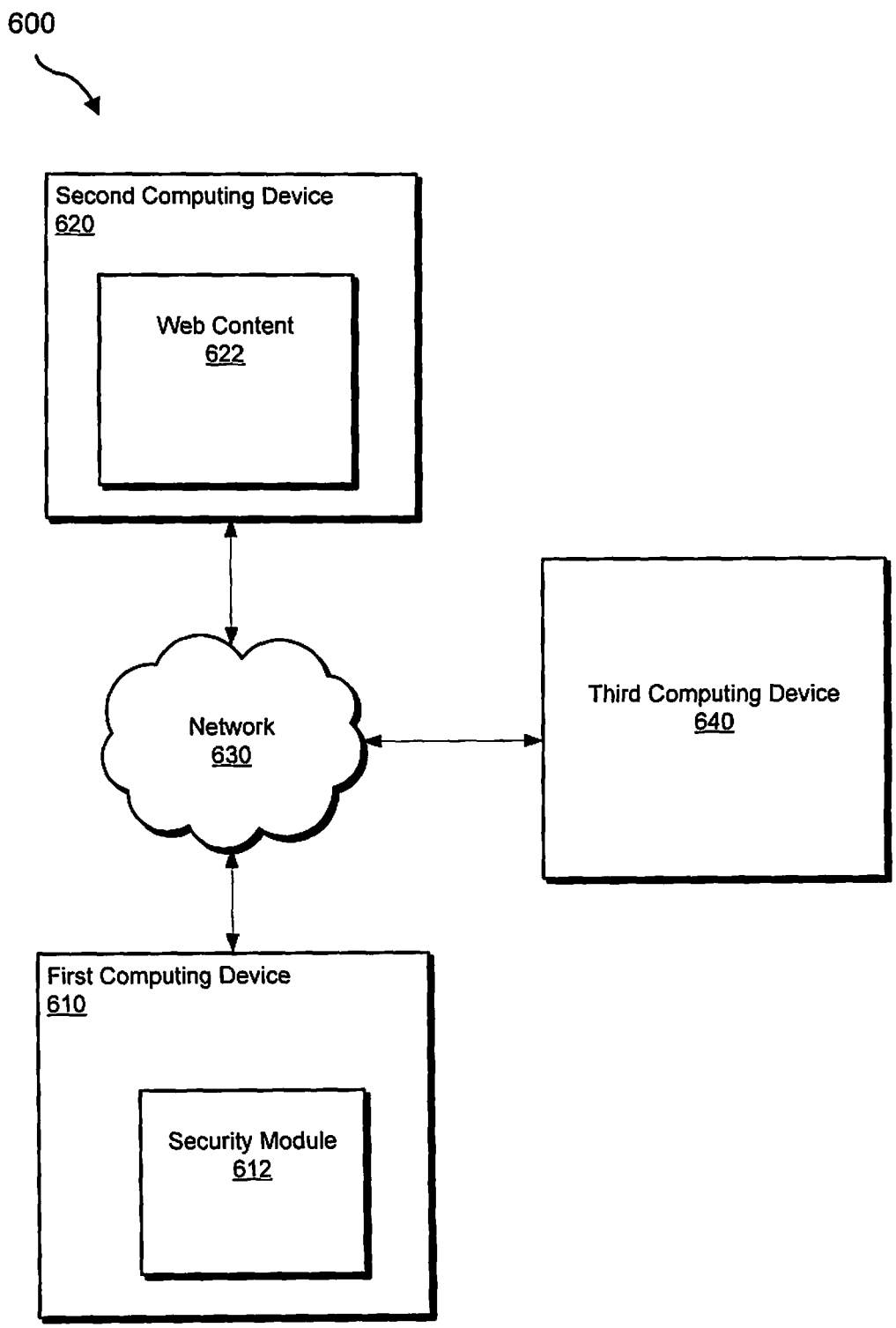
FIG. 6 is a block diagram of an exemplary system for processing web content to corrupt malicious code according to certain embodiments.

In the following disclosure, FIGS. 1 and 6 illustrate exemplary computing devices having a security module for modifying web content received over a network. FIGS. 2-5 illustrate exemplary methods for receiving and modifying web content that is encoded with malicious steganographic code. Descriptions of an exemplary system and an exemplary network architecture capable of implementing one or more of the embodiments described and/or illustrated herein are provided in connection with FIGS. 7 and 8.

FIG. 1 is a block diagram of an exemplary system 100 that includes a computing device 110 having a security module 112 for modifying web content 122 encoded with malicious steganographic code. As illustrated in FIG. 1, exemplary system 100 may comprise a first computing device 110 and a second computing device 120. The phrase "computing device," as used herein, may generally refer to any electrical device capable of processing computer-executable instructions (i.e., comprising a central processing unit). Examples of computing devices may include desktop computers, laptops, workstations, servers, storage devices, cellular phones, personal digital assistants, multimedia players, combinations of computing devices, or any other devices capable of processing computer-executable instructions.

Security module 112 may be installed on first computing device 110 and may provide protection for first computing device 110 and/or for an additional computing device connected directly or indirectly to first computing device 110. Security module 112 may be a program configured to process various forms of web content 122 received by first computing device 110 from second computing device 120. Security module 112 may be programmed to perform the steps shown in FIGS. 2-5.

In at least one embodiment, first computing device 110 and second computing device 120 may communicate over a network 130. Network 130 may generally represent any type or form of communication or computing network, including, for example, the Internet, an intranet, a wide area network (WAN), a local area network (LAN), or a personal area network (PAN).

First computing device 110 may comprise a computing device used by an end-user. In other embodiments, first computing device 110 may comprise a host server that hosts content, such as a web server that stores and provides access to various types of web content. In various embodiments, first computing device 110 may comprise a proxy server through which an end user may make indirect connections through network 130 to other computing devices (see FIG. 6). Second computing device 120 may comprise a computer used by an end user and/or may comprise a server.

As illustrated in FIG. 1, second computing device 120 may host web content 122. Web content 122 may include various forms of code encoded with malicious steganographic code. In various embodiments, web content 122 may include web content distributed over the Internet. Examples of web content 122 include HTML, Java Script, and various types of media files, including image files, audio files, video files, and animation files. Web content 122 may be hosted on second computing device 120 such that web content 122 is searchable by and/or transferrable to other computing devices connected to network 130. For example, web content 122 may be located on a web page hosted on second computing device 120.

Security module 112 may process various types of content, such as web content 122 received by first computing device 110. In certain embodiments, security module 112 may specify certain criteria for processing content received by first computing device 110. For example, security module 112 may process content received over network 130 from sources identified as untrusted sources. In some embodiments, security module 112 may process content of a certain file type. For example, security module 112 may process all JavaScript content or all video content. Thus, security module 112 may determine which content to process based on various predefined criteria, such as a source of the content and/or a type of the content. In other embodiments, security module 112 may process all web content accessed by first computing device 110. Security module 112 may process content to disable or otherwise corrupt information conveyed by malicious steganographic code encoded in the content prior to presenting the content.

As used herein, corrupting malicious steganographic code refers to any process or procedure that renders steganographic code less useful for malicious purposes. For example, corrupting malicious steganographic may refer to a process that makes the steganographic code at least partially unreadable or unidentifiable as command-and-control code in a botnet. Corrupted malicious steganographic code may be steganographic code that is deleted, moved, or otherwise altered with web content.

Figure 2:
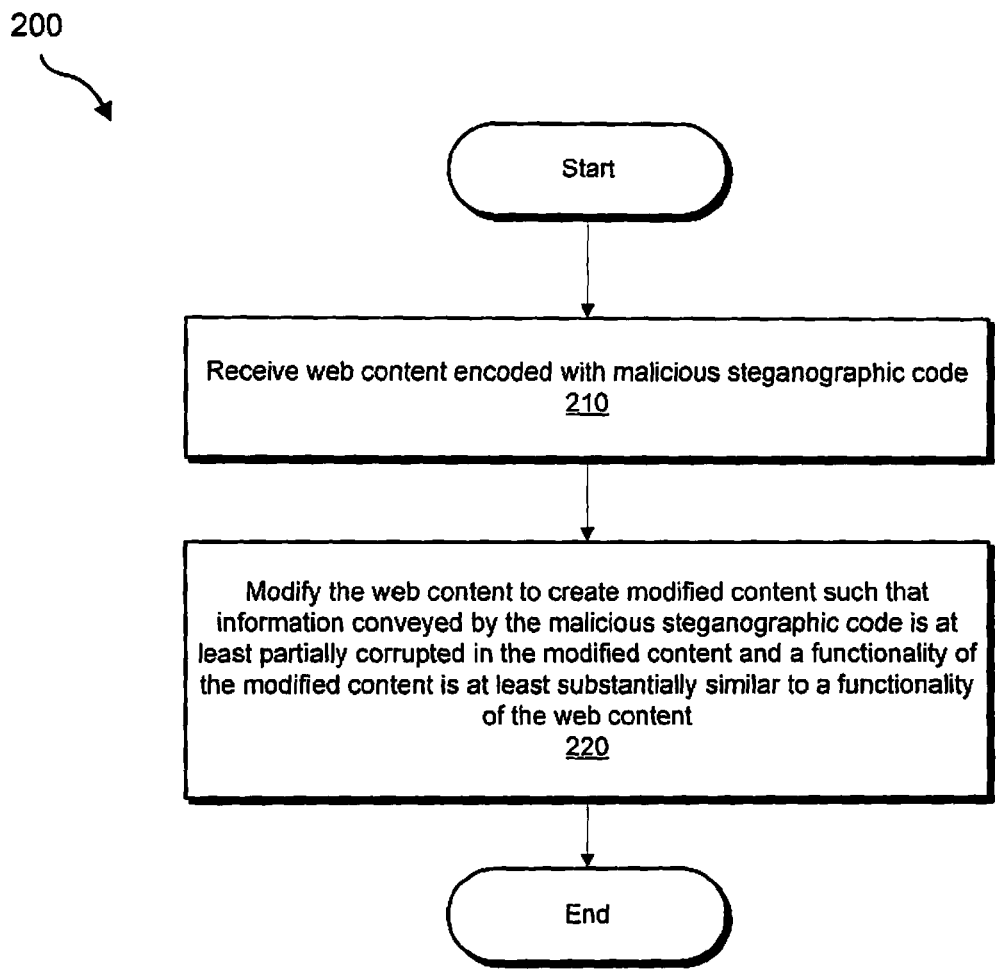
FIG. 2 is a flow diagram of an exemplary method for modifying web content to corrupt malicious code according to certain embodiments.

FIG. 2 illustrates an exemplary computer-implemented method 200 for processing web content to corrupt steganographic code. The method may be performed by computer-executable code, such as security module 112. First computing device 110 may receive web content 122 encoded with malicious steganographic code (step 210). Web content 122 may be received from second computing device 120, which hosts web content 122. In other embodiments, web content may be received from a user attempting to upload the web content to a web server. As illustrated in FIG. 1, second computing device 120 may host web content 122 encoded with malicious steganographic code.

Before web content 122 is presented, web content 122 may be modified to create modified content (step 220). For example, security module 112 may modify web content 122. Web content 122 may be modified before first computing device 120 presents web content 122. Presenting web content 122 may include rendering or otherwise opening web content 122 to present the content to a user of first computing device 120. In other embodiments, presenting web content 122 may include transferring web content 122 to another computing device or otherwise hosting web content 122 so that web content 122 is transferable to another computing device that is connected to first computing device 120.

In various embodiments, security module 112 may modify web content 122 in such a manner that information conveyed by malicious steganographic code encoded within web content 122 is at least partially corrupted in the modified content, rendering the malicious steganographic code unusable, or at least partially unusable. For example, malicious steganographic code that is configured to act as a command channel for a bot may be at least partially corrupted following modification of web content 122 in which the malicious steganographic code is encoded. Accordingly, a bot crawling the internet may not recognize the corrupted malicious code in the modified content and/or the malicious code may be corrupted in such a manner that it no longer functions as a command channel for the bot.

Security module 112 may be configured to modify web content 122 in such a manner that a functionality of the modified content is substantially similar to a functionality of the web content 122. For example, web content 122 may be an image file and may present substantially the same image in a substantially similar manner both prior to and following modification by security module 112. Accordingly, while a user may perceive only a small difference or no difference between an image from by an image file before and after modification by security module 112, malicious steganographic code encoded in the image file may be rendered unusable following modification.

The term "functionality," as used herein to refer to web content, may refer to an intended use of the web content. For example, the functionality of web content 122 comprising an image file may be to convey an image to an end user. The functionality of the content may be maintained when the image presented to the user appears to be substantially the same after modification of the image file by security module 112. In other words, an image presented to a user by an image file that has been modified by security module 112 may be, or may appear to a user to be, substantially similar to an image presented by the image file prior to modification. In contrast, information conveyed by malicious steganographic code encoded in the image file may be at least partially corrupted following modification of the image file by security module 112.

Modification of web content 122 may be performed at various points prior to being presented to an end user. For example, modification of web content 122 may be performed at a web proxy. In such a case, first computing device 110 may comprise a web proxy server. Modification of web content 122 may be performed inline by the security module 112 as web content 122 is received by first computing device 110 and/or at a point after web content 122 is received by first computing device 110 and prior to transferring web content 122 to a third computing device (see, e.g., third computing device 640 in FIG. 6).

In additional embodiments, modification of the content may be performed after web content 122 is received by first computing device 110 and/or after web content 122 is stored in a browser cache on first computing device 110. Modification of the content may also be performed before a browser or any other process opens web content 122. In at least one example, security module 112 may comprise an on-host security agent that processes any content received by a server or other computing device hosting the security agent. Security module 112 may comprise a browser component located within an internet browser on first computing device 110. When security module 112 comprises a browser component, security module 112 may process web content 122 prior to opening web content 122 in a browser.

Web content 122 may be modified by security module 112 in any suitable manner to form modified content in which information conveyed by encoded malicious steganographic code is at least partially corrupted. In at least one embodiment, web content 122 may be modified by renaming variables in web content 122. For example, variables in the web content 122 comprising JavaScript code may be renamed. In some embodiments, characters may be added to the web content 122. For example, various characters, including letters, numbers, symbols, and/or white-space characters may be added to web content 122. Characters and/or variable names in web content 122 used to encode malicious steganographic code may be changed, thereby altering and corrupting information conveyed by the malicious code in the modified content.

According to certain embodiments, security module 112 may modify web content 122 by rearranging segments of web content 122. The segments in web content 122 may contain substantially the same or similar code (e.g., code with substantially the same functionality) before and after modification by security module 112, while the order of the segments in relation to one another in web content 122 and the modified content may be different. For example, security module 112 may rearrange an order of hypertext-markup-language parameters in the content. In other embodiments, security module 112 may rearrange the segments and may include appropriate additional code in the modified content to enable the modified content to function in substantially the same manner as web content 122. Rearranging the segments may disrupt malicious steganographic code encoded in web content 122, such as malicious code encoded over two or more of the segments, thereby corrupting information conveyed by the malicious code.

In various embodiments, security module 112 may be located on a computing device, such as first computing device 110, that acts as a web server hosting various forms of content uploaded by third party users over the Internet. A third party user may upload and post web content 122 to first computing device 110 from second computing device 120. First computing device 110 may host one or more web pages, such as, for example, a web-based email site, a weblog, a picture site, and/or a social networking site. Security module 112 may be located on computing device 110 (i.e., the web server) and may process all content sent to computing device 110 before it is hosted on computing device 110. In some embodiments, security module 112 may process all content uploaded to server 110 before the content is made accessible to others. For example, if a user uploads a picture to a social networking site, security module 112 may process the picture before posting the picture to the user's web site. Thus, before the picture is assessable to others, security module 112 may corrupt any steganographic code that may be encoded in the picture.

Figure 3:
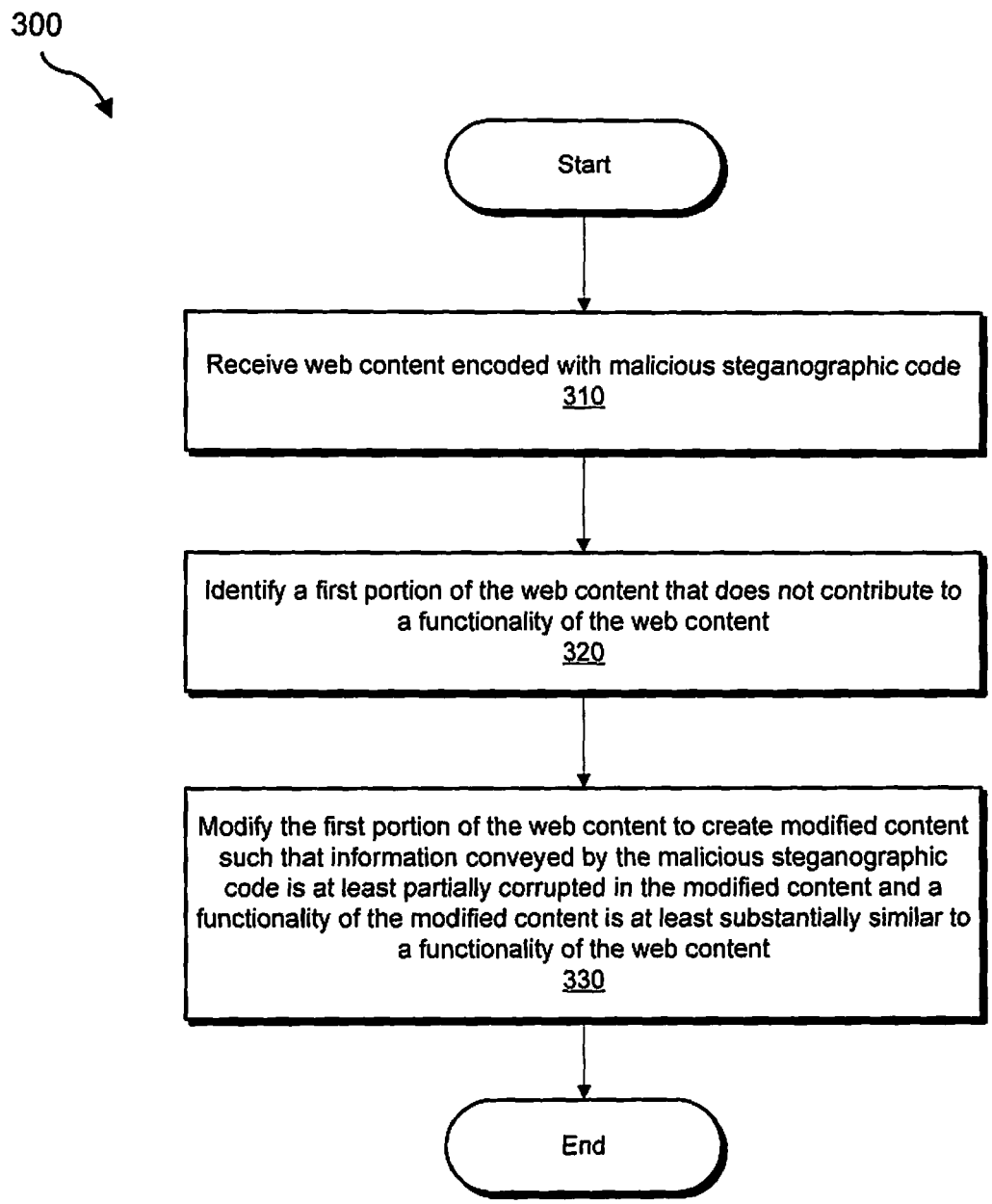
FIG. 3 is a flow diagram of an exemplary method for modifying web content to corrupt malicious code according to certain embodiments.

FIG. 3 illustrates an exemplary computer-implemented method 300 for processing web content according to an additional embodiment. The method may be performed by computer-executable code, such as security module 112. First computing device 110 may receive web content 122 encoded with malicious steganographic code (step 310). Web content 122 may be received from second computing device 120, which hosts web content 122.

Security module 112 may identify a first portion of web content 122 that does not contribute to a functionality of web content 122 (step 320). In various embodiments, portions of web content 122, such as portions of HTML code, may comprise comments and/or white space. The comments and white-space portions in the HTML code may not be part of the HTML code that is rendered in a browser. Accordingly, the comments and white space may be portions of the HTML code that do not contribute to a functionality of the HTML code, and malicious programmers may use non-functional portions of web content 122 to carry information that drives bots. Security module 112 may identify one or more comments and/or white-space portions of HTML code in web content 122.

Once security module 112 has identified a first portion of web content 122 that does not contribute to a functionality of web content 122, security module 112 may modify the first portion of web content 122 to create modified content. In various embodiments, security module 112 may modify the first portion of web content 122 such that information conveyed by malicious steganographic code embedded within the first portion is at least partially corrupted, rendering the malicious steganographic code unusable.

The first portion of web content 122 may be modified by security module 112 in various ways. For example, the first portion of web content 122 may be modified by changing and/or rearranging one or more characters in the first portion. The first portion of web content 122 may also be modified by adding characters to the first portion. Additionally, since the first portion of web content 122 does not contribute to a functionality of web content 122, the first portion may also be partially or completely removed from web content 122.

Figure 4:
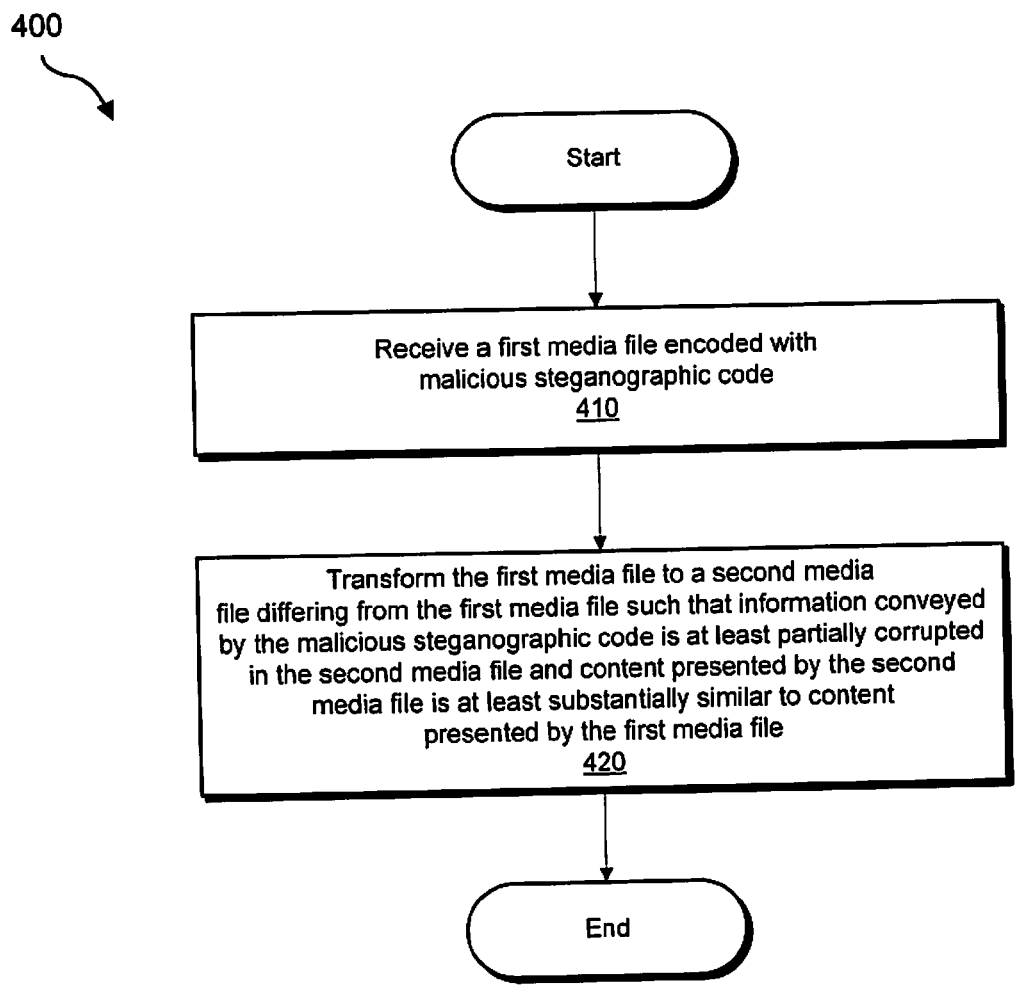
FIG. 4 is a flow diagram of an exemplary method for transforming a first media file to a second media to corrupt malicious code according to certain embodiments.

FIG. 4 illustrates an exemplary computer-implemented method 400 for processing a media file according to at least one embodiment. The method may be performed by computer-executable code, such as security module 112. First computing device 110 may receive a first media file encoded with malicious steganographic code (step 410). The first media file may be received from second computing device 120, which hosts the media file. In other embodiments, the first media file may be received from a user attempting to upload the first media file to a web server. In various embodiments, web content 122 may comprise the media file.

The first media file may represent any type or form of media file that presents a visual and/or auditory experience to a user. Examples of the first media file include image files, audio files, video files, and animation files. Malicious steganographic code may be encoded within the media file such that the malicious code is covertly incorporated into visual and/or auditory aspects of the media file. For example, code in a media file that presents a visual and/or auditory stimulus to user may be encoded with malicious steganographic code. A bot encountering the media file on network 130 may recognize the malicious steganographic code, enabling the malicious code to operate as a command channel for the bot. Transforming the first media file to the second media file may corrupt information conveyed by the malicious steganographic code in a manner that prevents the bot from using the steganographic code.

Before presenting the first media file, security module 112 may transform the first media file to a second media file differing from the first media file (step 420). Security module 112 may transform the first media file to the second media file using any suitable technique. In certain embodiments, the transformation of the first media file to the second media file may effectively corrupt information encoded by malicious steganographic code. The transformation may result in a change (possibly even a small change) to a portion of first media file. In some embodiments, security module 112 may convert the first media file, which may be in a first format, to the second media file, which may be in a second format. For example, the first media file may comprise a JPG image. Security module may convert the first media file to a BMP image.

According at least one embodiment, security module 112 may alter various auditory and/or visual aspects of the first media file in transforming the first media file to the second media file. For example, security module 112 may transform a first media file comprising an image, audio, video, and/or animation file to a second media file such that content presented by the second media file differs from content presented by the first media file in at least one of color brightness, color hue, color saturation, image size, image resolution, and/or any other suitable visual aspect. Additionally, content presented by the second media file may differ from content presented by the first media in any suitable auditory aspect. These alterations to auditory and/or visual aspects of the first media file may be applied to a significant portion of the first media file. For example, security module 112 may alter the hue of substantially all of the pixels forming visual content presented by a media file.

In certain embodiments, security module 112 may transform the first media file by compressing and/or decompressing the first media file to form the second media file. In additional embodiments, security module 112 may transform the first media file by encoding and/or decoding the first media file to form the second media file.

Following conversion of the first media file to the second media file, information conveyed by malicious steganographic code embedded within the first media file may be at least partially corrupted in the second media file. In addition, content presented by the second media file may be at least substantially similar to content presented by the first media file. For example, a first media file comprising an audio file may be transformed by security module 112 to a second media file differing from the first media file. Audio content presented to a user by the second media file may sound substantially similar to audio content presented to the user by the first media file. Transforming the first media file to the second media file may corrupt information conveyed by malicious steganographic code, but may retain the functionality of the second media file.

FIG. 5 illustrates an exemplary computer-implemented method 400 for processing a media file according to various embodiments. The method may be performed by computer-executable code, such as security module 112. First computing device 110 may receive a first media file encoded with malicious steganographic code (step 510). The first media file may be received from second computing device 120, which may host the media file. Prior to presenting the first media file to a user, security module 112 may transform the first media file to a second media file that differs from the first media file in at least one aspect (step 520).

Additionally, security module 112 may transform the second media file to a third media file differing from the first media file (step 530). According to certain embodiments, the first media file may be in a first format and the second media file may be in a second format differing from the first format. The third media file may be in the first format. The third media file may therefore have the same format as the first media file. For example, security module 112 may transform a first media file comprising a JPG file to a second media file comprising a BMP file. Subsequently, security module 112 may transform the second medial file to a third media file comprising a JPG file. Thus, a user may be presented with a third media file that is in the same format as the first media file transferred to the first computing device 110. Although the third media file may be in the same format as the first media file, transforming the first media file to the second media file and/or transforming the second media file to the third media file may corrupt information conveyed by malicious steganographic code encoded in the first media file.

FIG. 6 is a block diagram of an exemplary system 600 that includes a computing device 610 having a security module 612 for modifying web content 622 encoded with malicious steganographic code. As illustrated in FIG. 6, exemplary system 600 may comprise a first computing device 610, a second computing device 620, and a third computing device 640. First computing device 610, second computing device 620, and third computing device 640 may communicate over a network 630.

In at least one embodiment, first computing device 610 may be a proxy server. For example, first computing device 610 may comprise a proxy server through which third computing device 640 may communicate with second computing device 620. Security module 612 may be installed on first computing device 610 and may provide protection for third computing device 640 by preventing content encoded with malicious steganographic code from being transferred to third computing device 640. Security module 612 may be a program coded to process various forms of web content 622 received by first computing device 610 from second computing device 620 prior to passing web content 622 on to third computing device 640. Security module 612 may be programmed to perform the steps shown in FIGS. 2-5 above.

Figure 7:
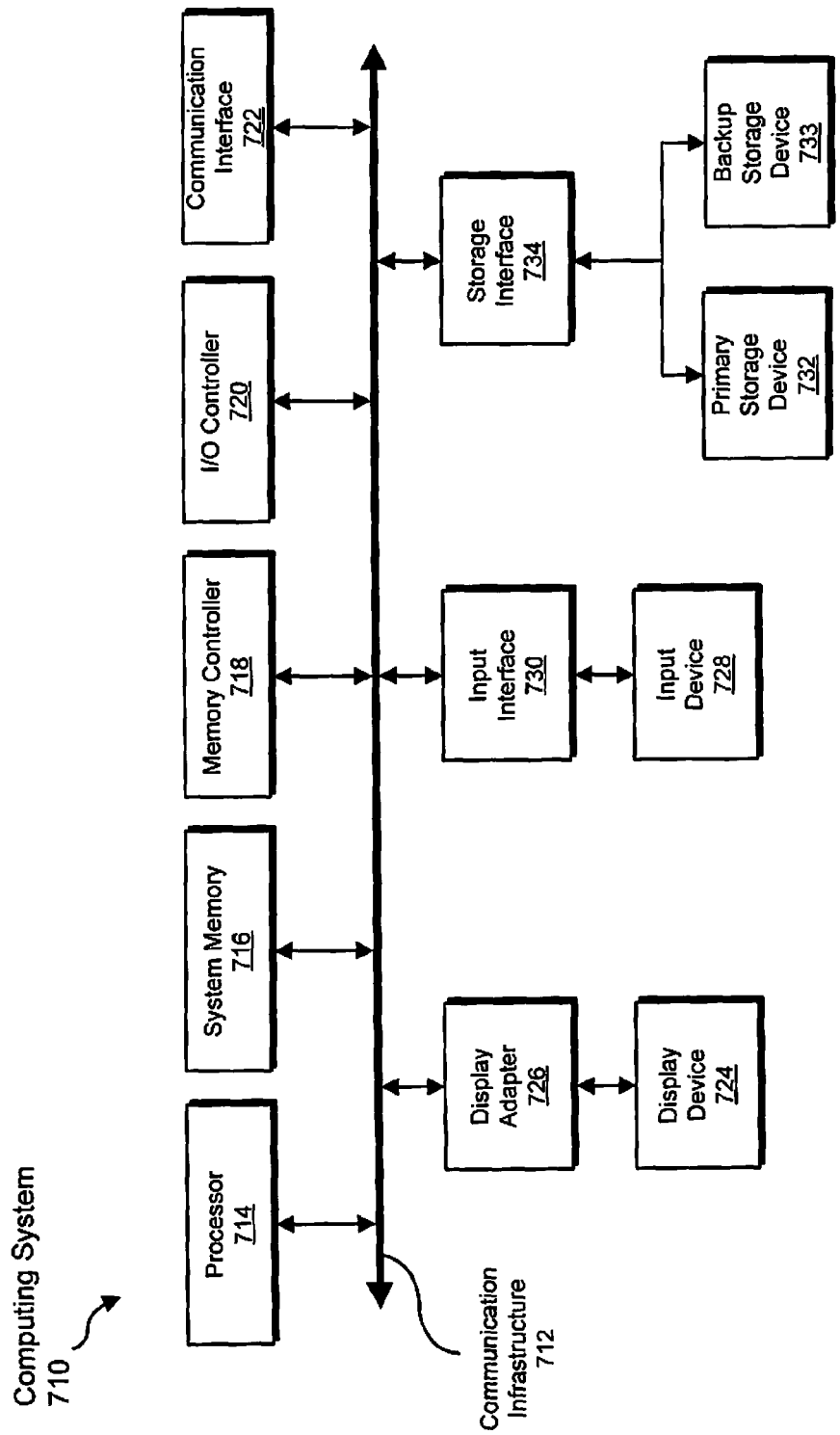
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, modifying, identifying, and transforming steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as receiving, modifying, identifying, and transforming.

I/O controller 720 generally represents any type or form of module capable of coordinating and/or controlling the input and output functions of a computing device. For example, in certain embodiments I/O controller may control or facilitate transfer of data between one or more elements of computing system 710, such as processor 714, system memory 716, communication interface 722, display adapter 727, input interface 730, and storage interface 734. I/O controller 720 may be used, for example, to perform and/or be a means for performing, either alone or in combination with other elements, one or more of the receiving, modifying, identifying, and transforming steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 794 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, modifying, identifying, and transforming steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, modifying, identifying, and transforming steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the receiving, modifying, identifying, and transforming steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
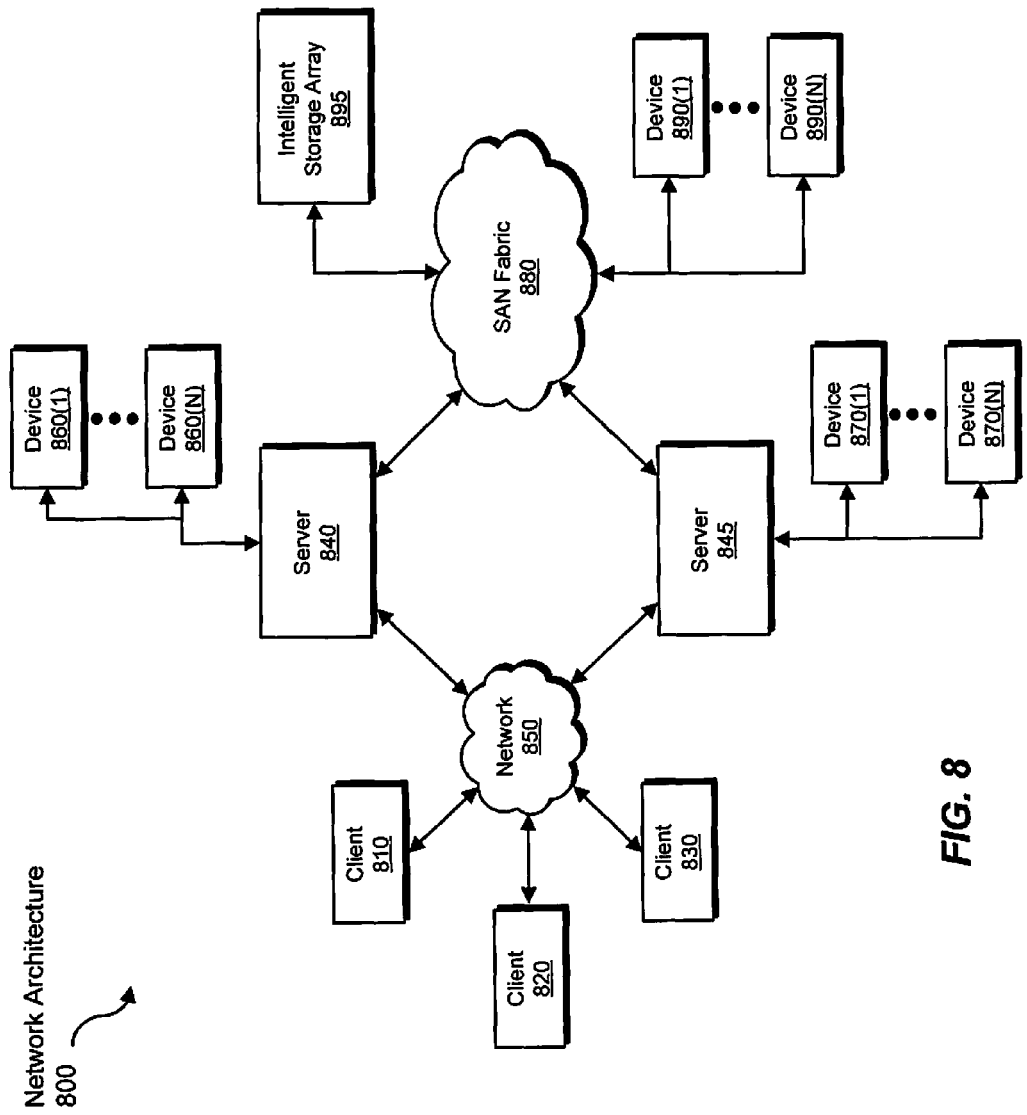
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, modifying, identifying, and transforming steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, computing system 710 and/or one or more of the components of network architecture 800 may perform and/or be a means for performing a computer-implemented method for processing web content. The method may comprise receiving web content encoded with malicious steganographic code. The web content may be received from a computing device that hosts the web content. In other embodiments, the web content may be received from a user attempting to upload the web content to a web server.

Before presenting the web content, the method may comprise modifying the web content to create modified content such that information conveyed by the malicious steganographic code is at least partially corrupted in the modified content. Additionally, a functionality of the modified content may be at least substantially similar to a functionality of the web content following modification of the web content to create the modified content.

In some embodiments, the method may additionally comprise identifying a first portion of the web content that does not contribute to the functionality of the web content. Modifying the web content may comprise modifying the first portion. Modifying the first portion may also comprise removing the first portion. Additionally, modifying the first portion may comprise changing characters in the first portion. The first portion may comprise comments and/or white space.

According to various embodiments, modifying the web content may be performed inline at a web proxy. Modifying the web content may also be performed after the web content is stored in a browser's cache. Modifying the web content may comprise renaming variables in the web content. Modifying the web content may also comprise adding characters to the web content. Modifying the web content may further comprise rearranging segments of the web content.

In some embodiments, the web content may comprise a media file and modifying the web content may comprise modifying the media file to create a modified media file. Modifying the media file may comprise compressing the media file and/or decompressing the media file. In at least one embodiment, the media file may be in a first format. Modifying the media file may comprise converting the media file to the modified media file such that the modified media file is in a second format. Modifying the media file may additionally comprise modifying code associated with a visual aspect of the web content and/or code associated with an auditory aspect of the web content.

In certain embodiments, a computer-readable medium may comprise one or more computer-executable instructions that, when executed by a computing device, cause the computing device to receive web content encoded with malicious steganographic code. The web content may be received from a computing device that hosts the web content. The one or more computer-executable instructions may modify the web content to create modified content before presenting the web content such that information conveyed by the malicious steganographic code is at least partially corrupted. After modification, a functionality of the modified content may be at least substantially similar to a functionality of the web content.

In at least one embodiment, a computer-implemented method for processing a media file may comprise receiving a first media file encoded with malicious steganographic code. The first media file may be received from a computing device that hosts the first media file. In other embodiments, the first media file may be received from a user attempting to upload the first media file to a web server. The computer-implemented method may comprise transforming the first media file to a second media file differing from the first media file before presenting the first media file. After the transformation, information conveyed by the malicious steganographic code may be at least partially corrupted in the second media file. Content presented by the second media file may be at least substantially similar to content presented by the first media file. The first media file may be in a first format and the second media file may be in a second format.

In various embodiments, the computer-implemented method may further comprise transforming the second media file to a third media file differing from the first media file. Content presented by the third media file may be at least substantially similar to content presented by the first media file. The third media file may be in the first format (i.e., the same format as the first media file). Content presented by the second media file may differ from content presented by the first media file in color brightness, color hue, color saturation, and/or image size.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method, at least a portion of the method being performed by a computing system comprising at least one processor, the computer-implemented method comprising:
   receiving web content encoded with malicious steganographic code;
   identifying a first portion of the web content that does not contribute to a functionality of the web content and within which the malicious steganographic code is stegoed;
   before presenting the web content, corrupting the malicious steganograhic code by modifying the web content to create modified content, wherein modifying the web content comprises deleting, moving, and/or altering the first portion of the web content such that:
      a malicious application is unable to decode a message conveyed by the malicious steganographic code;
      a functionality of the modified content is at least similar to the functionality of the web content.

2. The computer-implemented method of claim 1, wherein modifying the web content comprises rearranging segments of the first portion of the web content.

3. The computer-implemented method of claim 1, wherein:
   modifying the web content comprises removing the first portion of the web content.

4. The computer-implemented method of claim 1, wherein:
   modifying the web content comprises changing characters in the first portion of the web content.

5. The computer-implemented method of claim 1, wherein:
   the first portion of the web content comprises at least one of:
      comments;
      white space.

6. The computer-implemented method of claim 1, wherein modifying the web content is performed at one of:
   a web proxy;
   a computing device that hosts the web content.

7. The computer-implemented method of claim 1, wherein:
   modifying the web content is performed after the web content is stored in a browser's cache.

8. The computer-implemented method of claim 1, wherein:
   the web content is received from a computing device that hosts the web content.

9. The computer-implemented method of claim 1, wherein modifying the web content comprises at least one of:
   adding characters to the first portion of the web content;
   renaming variables in the first portion of the web content.

10. The computer-implemented method of claim 1, wherein modifying the web content comprises rearranging segments of the web content.

11. The computer-implemented method of claim 10, wherein:
    rearranging segments of the web content comprises rearranging an order of hypertext-markup-language parameters.

12. The computer-implemented method of claim 1, wherein:
    the web content comprises a media file;
    modifying the web content comprises modifying the media file to create a modified media file;
    modifying the media file comprises at least one of:
       compressing the media file;
       decompressing the media file.

13. The computer-implemented method of claim 12, wherein:
- the media file is in a first format;
- modifying the media file comprises converting the media file to the modified media file such that the modified media file is in a second format.

14. The computer-implemented method of claim 12, wherein:
- modifying the media file comprises modifying at least one of:
  - code associated with a visual aspect of the web content;
  - code associated with an auditory aspect of the web content.

15. A non-transitory computer-readable medium comprising one or more computer-executable instructions that, when executed by a computing device, cause the computing device to:
- receive web content encoded with malicious steganographic code;
- identify a first portion of the web content that does not contribute to a functionality of the web content and within which the malicious steganographic code is stegoed;
- before presenting the web content, corrupt the malicious steganograhic code by modifying the web content to create modified content, wherein modifying the web content comprises deleting, moving, and/or altering the first portion of the web content such that:
  - a malicious application is unable to decode a message conveyed by the malicious steganographic code;
  - a functionality of the modified content is at least similar to the functionality of the web content.

16. A computer-implemented method for processing a media file, at least a portion of the method being performed by a computing system comprising at least one processor, the computer-implemented method comprising:
- receiving a first media file encoded with malicious steganographic code;
- identifying a first portion of the first media file that does not contribute to a functionality of the first media file and within which the malicious steganographic code is stegoed;
- before presenting the first media file, corrupting the malicious steganograhic code by transforming the first media file to a second media file differing from the first media file, wherein transforming the first media file comprises deleting, moving, and/or altering the first portion of the first media file such that:
  - a malicious application is unable to decode a message conveyed by the malicious steganographic code;
  - content presented by the second media file is at least similar to content presented by the first media file.

17. The computer-implemented method of claim 16, wherein:
- the first media file is in a first format and the second media file is in a second format.

18. The computer-implemented method of claim 17, further comprising:
- transforming the second media file to a third media file differing from the first media file, wherein content presented by the third media file is at least similar to content presented by the first media file.

19. The computer-implemented method of claim 18, wherein:
- the third media file is in the first format.

20. The computer-implemented method of claim 16, wherein:
- content presented by the second media file differs from content presented by the first media file in at least one of:
  - color brightness;
  - color hue;
  - color saturation;
  - image size.

* * * * *